UNITED STATES PATENT OFFICE.

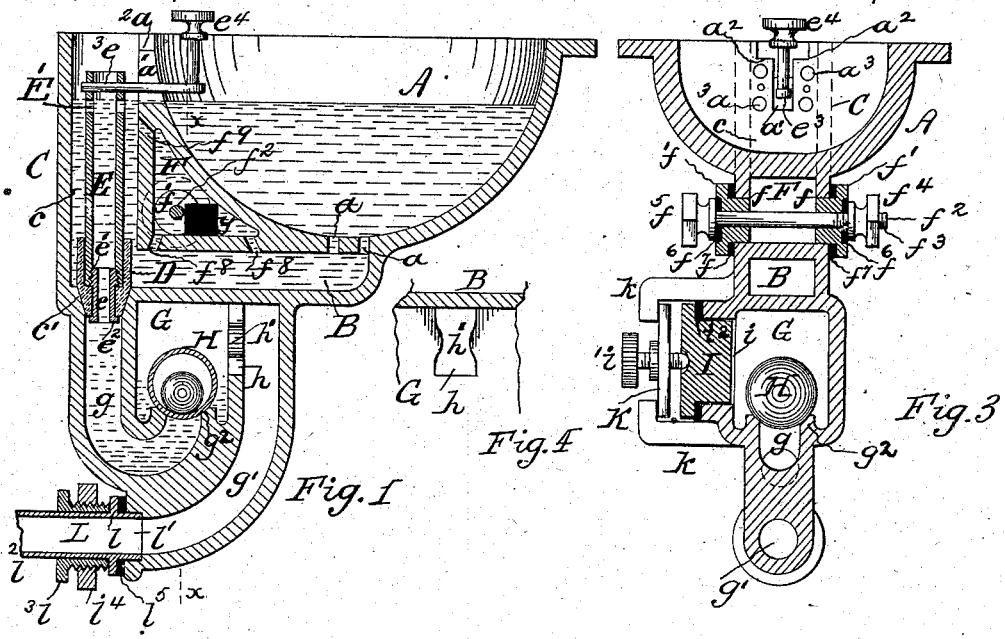
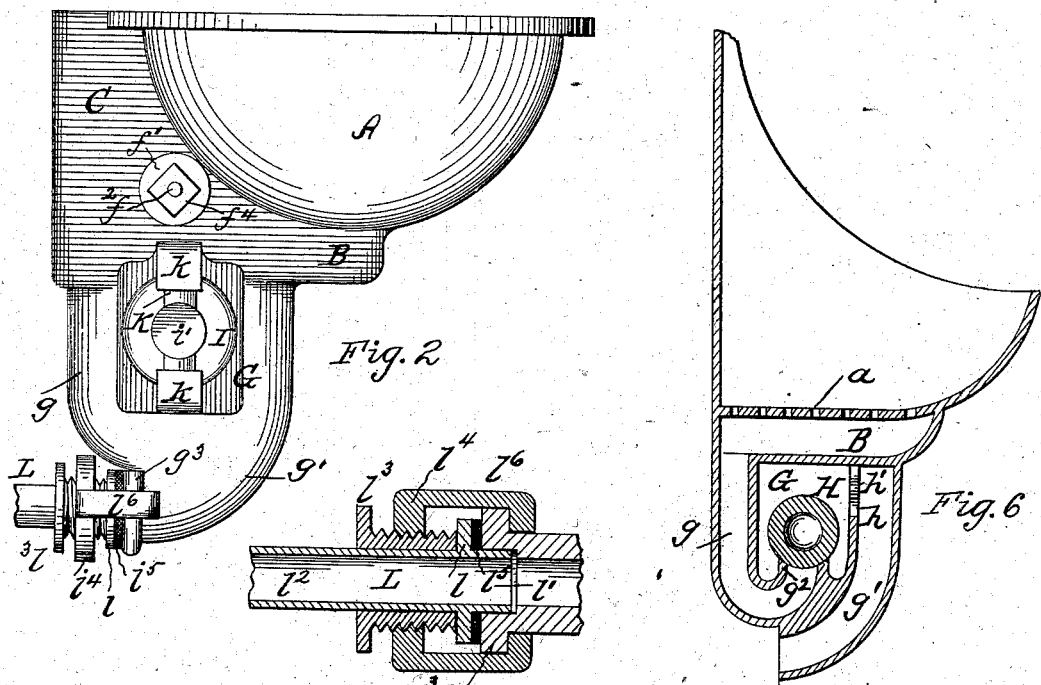

JOSEPH BENNOR, OF PHILADELPHIA, PENNSYLVANIA.

WASH-BASIN.

SPECIFICATION forming part of Letters Patent No. 289,496, dated December 4, 1883.

Application filed April 9, 1883. (No model.)

*To all whom it may concern:*

Be it known that I, JOSEPH BENNOR, a citizen of the United States, residing at Philadelphia, in the county of Philadelphia and State of Pennsylvania, have invented certain new and useful Improvements in Wash-Basins, of which the following is a specification, reference being had therein to the accompanying drawings, wherein—

Figure 1 is a longitudinal vertical section of a wash-basin embodying my invention. Fig. 2 is an elevation of the same. Fig. 3 is a section on the line $x$ $x$, Fig. 1. Figs. 4 and 5 are detail broken sections; and Fig. 6 is a vertical section of part of my improvements applied to a urinal.

My invention has relation to wash-basins, lavatories, and other like fixtures; and has for its object to reduce the expense and labor of fitting up and placing such fixtures in position for use; to disinfect their outlet-pipes and traps, and to dispense with the employment of the chain and stopple heretofore used for closing the outlet at the bottom of the bowl, or basin.

My invention, accordingly, consists of the novel combination, construction, and arrangement of parts, as hereinafter specifically described and claimed, having reference particularly to the provision of a bowl having a rear or lateral extension or chamber, which communicates with the outlet-pipe of the bowl and with the trap for the latter, said parts being formed integral with each other; and, further, in combination therewith, of a chamber for holding a suitable disinfectant.

In the drawings, A represents a bowl or basin having at its bottom a series of perforations, $a$ $a$, which form a strainer leading into the outlet-pipe B. At the rear or side of the bowl, preferably the former, is an extension, C, having a chamber, $c$, into which leads the outlet-pipe B. Below the junction of said chamber and outlet-pipe is a seat, $c'$, for a valve, D, which consists of a rubber or other elastic gasket secured to a pipe, E, by a hollow nut or thimble, $e$, which screws upon said pipe, as shown at $e'$, said gasket being held between the lower end of pipe E and the flange $e^2$ of the nut $e$. The pipe E extends upwardly in the chamber $c$ and is provided with a rod or bar, $e^3$, which passes through a lateral slot, $a'$, in the side of bowl A and terminates in a knob or handle, $e^4$. The slot $a'$ is formed with shoulders $a^2$ $a^2$, for forming a support or catch for the rod $e^3$ to rest upon and hold the tube E and valve D in an elevated position when the latter is lifted from its seat $c'$. On each side of the slot $a'$ is a series of perforations, $a^3$, which serve as a strainer for the overflow from the bowl. Bounded by the walls of chamber $c$, bowl A, and the outlet-pipe B is a chamber, F, having lateral openings $f$ $f$, which are closed by caps $f'$ $f'$. Through the latter passes a bolt, $f^2$, with threaded end $f^3$ and nut $f^4$. Interposed between the head $f^5$ of the bolt, its nut $f^4$, and the caps $f'$ $f'$ are gaskets or packing $f^6$; and $f^7$ are other gaskets, located between said caps and the walls of chamber F, so that by turning the nut $f^4$ in one direction the bolt and the caps are caused to press upon the gaskets $f^6$ $f^7$, respectively, to form tight joints and hermetically seal the chamber F. By unscrewing the nut from the bolt $f^2$ one of the caps or both of them may, if desired, be removed from the openings $f$ $f$, for the purpose of inserting a cake or supply of a suitable disinfectant into the chamber F, which disinfectant is indicated at $y$, Fig. 1. The chamber F communicates with outlet B and chamber $c$ by means of the apertures or ducts $f^8$ $f^9$, respectively, so that when valve D is down upon its seat $c'$ water flowing into the bowl A will pass through the perforations $a$ and rise in the outlet-pipe B, chambers $c$ and F, and bowl A until it reaches the openings E' in pipe E or is on a level with the apertures $a^3$ of the bowl A. If such water continue to flow, the overflow from bowl A will then pass through the openings E' into pipe E, and thence through the same and nut $e$ to the trap or waste pipe of the bowl. As the water rises in the chamber F the disinfectant therein is partially dissolved to form a supply of disinfecting-fluid. When the valve D is lifted to unseal the outlet $c'$ such disinfecting-fluid commingles with the water escaping from the bowl, and such waste water is thereby charged with the disinfectant to provide an increased supply for disinfecting and deodorizing the trap and waste-pipe of the fixture.

Any form of trap may be employed, but I prefer to use a trap which is sealed by a ball-valve, and is formed integral with the bowl A. To this end I form a chamber, G, below the outlet-pipe B. Said chamber G connects with chamber $c$ by a duct, $g$, which is, therefore, the induction-pipe of the trap-chamber G. The end of pipe $g$ terminates in a seat, $g^2$, for the valve H, which may be an elastic valve provided with a load, as shown in Fig. 1, or it may be a metal valve, as illustrated in Fig. 6.

$h$ represents an outlet in chamber G leading to the eduction-pipe $g'$. The opening $h$ is an elongated one, and is contracted at or about its center, as more plainly shown in Fig. 4, to prevent the valve H being drawn or sucked into said opening and interfering with the free discharge of water from the trap-chamber. The latter is also provided with a lateral opening, $i$, through which the valve H is inserted into said chamber. The opening $i$ is closed and sealed by a cap, I, which bears against a gasket, $i^2$, and is held in place by a screw, $i'$, working in a cross-bar, K, which engages with lugs $k\ k$ formed on the sides or walls of chamber G. By turning the screw $i'$ the cover I is caused to bear against gasket $i^2$ to form a hermetically-sealed joint between said chamber and cap. By removing the cap I the chamber G may be inspected and cleansed or otherwise treated as desired. The pipe $g'$ may be joined to the waste-pipe for the fixture, by means of a coupling, which consists of a tube or sleeve, L, having a collar, $l$. The end $l'$ of said tube passes into the eduction-pipe $g'$, as shown, and the collar $l$ impinges against an interposed gasket, $l^5$. Upon the end $l^2$ of tube L is placed a sleeve, $l^3$, which is exteriorly threaded, and engages with a nut, $l^4$, having arms $l^6$, which embrace a bead or lugs, $g^3$, on pipe $g'$, as more plainly shown in Fig. 5. By turning the sleeve $l^3$ the collar $l$ of tube L is caused to compress gasket $l^5$ to form a tight joint between said tube L and the outlet of pipe $g'$, whereupon the waste-pipe is soldered or otherwise secured to the end $l^2$ of tube L.

The last-named devices, together with the caps $f'$ and I, with their adjusting mechanism, are designed to be used when the bowl A and its component parts are made of porcelain or other similar material; but when formed of iron or other like substance, the caps $f'$ and I are then screwed into position and the pipe $g'$ secured to the waste-pipe in the usual or other suitable way.

It will be noticed that the basin A, extension C, outlet-pipe B, and trap G, with its induction and eduction pipes are all formed integral with each other. Consequently all fitting together of said parts is avoided, and when placed in position for use need only be connected to their proper water and waste pipes. If desired, the disinfecting-chamber F may be dispensed with.

In Fig. 6 I have shown the trap-chamber G and appurtenances cast or formed integral with a urinal bowl or basin, said parts being constructed and arranged substantially as above described, save that the extension C and chamber F are dispensed with.

If desired, the basin A may be formed without the extension C, and in lieu thereof the ordinary overflow-duct may be used, in which case the valve D is dispensed with. The usual outlet-opening provided for the bottom of the bowl and the customary stopple with chain is used to close said opening.

What I claim is—

1. A wash-basin or other like fixture having an outlet-pipe, a trap-chamber with a lateral opening, and eduction and induction pipes, all formed integrally, substantially as shown and described.

2. A wash-basin or other like fixture having a lateral extension, an outlet-pipe, a trap-chamber with lateral opening, and eduction and induction pipes, all formed integrally, substantially as shown and described.

3. A wash-basin or other like fixture having a lateral extension, an outlet-pipe, a disinfectant-containing chamber, a trap-chamber with lateral opening and induction and eduction pipes, all formed integrally, substantially as shown and described.

4. A wash-basin or other like fixture having a side opening or slot, $a'$, a lateral extension, an outlet-pipe, a trap-chamber, with induction and eduction pipes, all formed integrally, substantially as shown and described.

5. The combination with the bowl A, having a side opening or slot, $a'$, outlet-pipe B, and extension C, having chamber $c$ and valve-seat $c'$, of valve D, and means for moving the valve onto and off of said seat, substantially as shown and described.

6. The bowl A, having openings $a$, slot $a'$, with shoulders $a^2$, the extension C, having chamber $c$, provided with a valve-seat, $c'$, outlet-pipe B, and valve D, secured to tube E, having rod $e^3$, substantially as shown and described.

7. A wash-basin or other like fixture provided with a movable overflow-pipe carrying a valve and a handle which projects laterally into the bowl or the basin, substantially as shown and described.

8. A wash-basin provided with a movable overflow-pipe carrying a valve, a disinfectant-containing chamber and a trap, substantially as shown and described.

9. A wash-basin provided with an overflow-pipe, E, having valve D secured to said pipe by a hollow nut or thimble, E, and a laterally-projecting handle or lift-rod, $e^3$, adapted to project into the bowl or basin, substantially as shown and described.

10. The basin A, provided with an outlet-pipe, B, and with chamber F, having one or more openings, $f\ f$, with removable caps $f'$, and apertures $f^8$ leading to outlet-pipe B, substantially as shown and described.

11. The basin A, provided with an outlet-pipe, B, and with chamber F, having openings $f\ f$, gaskets $f^7\ f^7$, caps $f'\ f'$, bolt $f^2$ with nut $f^4$ and gaskets $f^6 f^6$, and openings $f^8$, substantially as shown and described.

12. The bowl A, having outlet-pipe B and trap-chamber G, provided with valve H, opening $i$, cap I, and outlet $h$, contracted at $h'$, substantially as shown and described.

13. The bowl A, having outlet-pipe B, and trap-chamber G, provided with lateral opening $i$, seat $g^2$, elongated outlet $h$, contracted at $h'$, and removable cap I, substantially as shown and described.

14. The bowl A, having pipe B, and chamber G, provided with opening $i$, cap I, gasket $i^2$, screw $i'$, cross-bar K, and lugs $k\ k$, substantially as shown and described.

15. A wash-basin or other like fixture provided with a trap carrying a ball or valve, H, and having an elongated outlet, $h$, contracted at $h'$, substantially as shown and described.

16. The bowl A, provided with lateral chamber $c$, having pipe E and valve D, the chamber F, having one or more removable caps, outlet-pipe B, communicating with bowl A and chamber F, and trap-chamber G, having ball or valve H, substantially as shown and described.

In testimony whereof I affix my signature in presence of two witnesses.

JOSEPH BENNOR.

Witnesses:
S. J. VAN STAVOREN,
CHAS. F. VAN HORN.